US011148383B2

(12) United States Patent
Waite et al.

(10) Patent No.: US 11,148,383 B2
(45) Date of Patent: Oct. 19, 2021

(54) WEIGHT-MEASUREMENT RETROFITTING FOR RECYCLABLE-WASTE BALERS

(71) Applicant: BACE, LLC, Charlotte, NC (US)

(72) Inventors: Frederick Waite, Huntersville, NC (US); Drew Sigmund, Jr., Mint Hill, NC (US)

(73) Assignee: BACE, LLC, Charlotte, NC (US)

( * ) Notice: Subject to any disclaimer, the term of this patent is extended or adjusted under 35 U.S.C. 154(b) by 99 days.

(21) Appl. No.: 16/371,747

(22) Filed: Apr. 1, 2019

(65) Prior Publication Data

US 2019/0224935 A1  Jul. 25, 2019

Related U.S. Application Data

(63) Continuation-in-part of application No. 15/483,816, filed on Apr. 10, 2017, now Pat. No. 10,564,029, and (Continued)

(51) Int. Cl.
*G01G 21/22* (2006.01)
*G01G 19/52* (2006.01)
(Continued)

(52) U.S. Cl.
CPC ........ *B30B 15/0094* (2013.01); *B30B 9/3007* (2013.01); *B30B 9/3046* (2013.01);
(Continued)

(58) Field of Classification Search
CPC ........ G01G 21/23; G01G 21/28; G01G 23/02; G01G 19/00; G01G 19/52; G01G 21/22;
(Continued)

(56) References Cited

U.S. PATENT DOCUMENTS 3,893,386 A    7/1975  Wise
4,258,810 A *  3/1981  Susor ............... G01G 3/12
                                                177/128

(Continued)

FOREIGN PATENT DOCUMENTS

CA    2788515      2/2014
EP    0508753      10/1992

(Continued)

OTHER PUBLICATIONS

WasteCare Corporation, "60" Vertical Balers Comparison Chart," accessed by Web Archive on Aug. 13, 2010, 5 pages.

(Continued)

*Primary Examiner* — Randy W Gibson
(74) *Attorney, Agent, or Firm* — Gardner Groff & Greenwald, PC

(57) ABSTRACT

A recycling method is disclosed that includes the steps of compacting recyclable material into a fixed bale of recyclable material while concurrently weighing the OCC in the compactor and independently of the force that the compactor applies to the material or to the bale, assigning an individual identifier to the fixed bale in which the identifier includes at least the weight of the bale, and sending the fixed identified bale to a destination selected from the group consisting of shippers, mills, rebalers, or a customers for the baled recyclable material. Also, devices and methods are disclosed for upgrading existing or new balers to enable them to perform at least some portions of the improved recycling methods. Example devices include baler-mounted load-cell weight sensors and U-shaped anchor plates for securing them in place in a free-floating arrangement.

24 Claims, 13 Drawing Sheets

Related U.S. Application Data a continuation-in-part of application No. 13/690,574, filed on Nov. 30, 2012, now Pat. No. 10,377,518, and a continuation-in-part of application No. 13/690,574, filed on Nov. 30, 2012, now Pat. No. 10,377,518.

(60) Provisional application No. 62/319,868, filed on Apr. 8, 2016.

(51) Int. Cl.
| | | |
|---|---|---|
| *B30B 15/00* | (2006.01) | |
| *B30B 9/30* | (2006.01) | |
| *B30B 15/08* | (2006.01) | |
| *B65F 1/14* | (2006.01) | |
| *G01G 19/00* | (2006.01) | |
| *G06Q 10/00* | (2012.01) | |
| *G06K 19/07* | (2006.01) | |
| *B65F 9/00* | (2006.01) | |
| *G01G 21/28* | (2006.01) | |

(52) U.S. Cl.
CPC ............ *B30B 15/08* (2013.01); *B65F 1/1405* (2013.01); *B65F 1/1484* (2013.01); *G01G 19/00* (2013.01); *G01G 19/52* (2013.01); *G01G 21/22* (2013.01); *B65F 9/00* (2013.01); *G01G 21/28* (2013.01); *G06K 19/0723* (2013.01); *G06Q 10/30* (2013.01)

(58) Field of Classification Search
CPC . B30B 15/0094; B30B 9/3007; B30B 9/3046; B30B 15/08; B65F 1/1405; B65F 1/1484; B65F 9/00; G06K 19/0723; G06Q 10/30
See application file for complete search history.

(56) References Cited

U.S. PATENT DOCUMENTS

| | | | |
|---|---|---|---|
| 4,742,880 A | 5/1988 | Schrag et al. | |
| 4,773,027 A | 9/1988 | Neumann | |
| 5,016,197 A | 5/1991 | Neumann et al. | |
| 5,174,198 A | 12/1992 | Bolstad | |
| 5,350,493 A | 9/1994 | Nguyen | |
| 5,359,153 A * | 10/1994 | Herrmann | G01G 21/22 |
| | | | 177/126 |
| 5,384,436 A | 1/1995 | Pritchard | |
| 5,742,010 A | 4/1998 | Griffin | |
| 5,770,823 A * | 6/1998 | Piroozmandi | G01G 21/23 |
| | | | 177/1 |
| 6,230,142 B1 * | 5/2001 | Benigno | G16H 70/20 |
| | | | 705/3 |
| 6,360,186 B1 | 3/2002 | Durbin | |
| 6,378,276 B1 | 4/2002 | Dorge et al. | |
| 6,787,713 B2 * | 9/2004 | Kuechenmeister | G01G 17/04 |
| | | | 177/132 |
| 7,146,294 B1 | 12/2006 | Waitkus | |
| 8,674,243 B2 * | 3/2014 | Curotto | B65F 1/1484 |
| | | | 177/136 |
| 8,919,210 B2 * | 12/2014 | Kjar | G01G 17/00 |
| | | | 73/862 |
| 9,188,476 B2 * | 11/2015 | Volker | G01G 21/22 |
| 9,347,818 B2 * | 5/2016 | Curotto | B65F 3/00 |
| 9,612,150 B2 * | 4/2017 | Perrea | G01G 21/23 |
| 9,651,413 B2 * | 5/2017 | Jaeger | G01G 21/23 |
| 10,718,657 B2 * | 7/2020 | Vasconcelos | G01G 21/23 |
| 10,768,042 B2 * | 9/2020 | Zhang | G01G 21/184 |
| 2006/0080819 A1 | 4/2006 | McAllister | |
| 2007/0175341 A1 | 8/2007 | Roberts | |
| 2007/0185612 A1 | 8/2007 | Stevens | |
| 2008/0061125 A1 | 3/2008 | Langlois et al. | |
| 2009/0235628 A1 | 9/2009 | Derstine et al. | |
| 2010/0179912 A1 | 7/2010 | Curotto | |
| 2012/0073456 A1 | 3/2012 | Lyle et al. | |
| 2012/0152133 A1 | 6/2012 | Newsome | |
| 2012/0285750 A1 | 11/2012 | Hynes et al. | |
| 2014/0122347 A1 | 5/2014 | Moran et al. | |
| 2016/0356640 A1 | 12/2016 | Freeman | |
| 2018/0364093 A1 * | 12/2018 | Vasconcelos | G01G 21/23 |
| 2020/0323169 A1 * | 10/2020 | Hogan | G01G 17/00 |

FOREIGN PATENT DOCUMENTS

| | | |
|---|---|---|
| EP | 0967320 | 12/1999 |
| GB | 1507800 | 4/1978 |
| JP | 2000142657 | 5/2000 |
| KR | 100252464 | 4/2000 |
| WO | 2009044092 | 4/2009 |

OTHER PUBLICATIONS

Green Recycling, "Services—Recycling Card/Cardboard/OGG (Old Corrugated Cardboard)," accessed by WebArchive on Jun. 18, 2012, 4 pages.

Pandora Intelligent Networks <http://www.pandoraintelligentnetworks.com/about.aspx> Retrieved Mar. 18, 2019, 1 page.

Marathon Equipment Company, "RamJet Compactor Options," at least as early as Apr. 8, 2016, 8 pages.

* cited by examiner

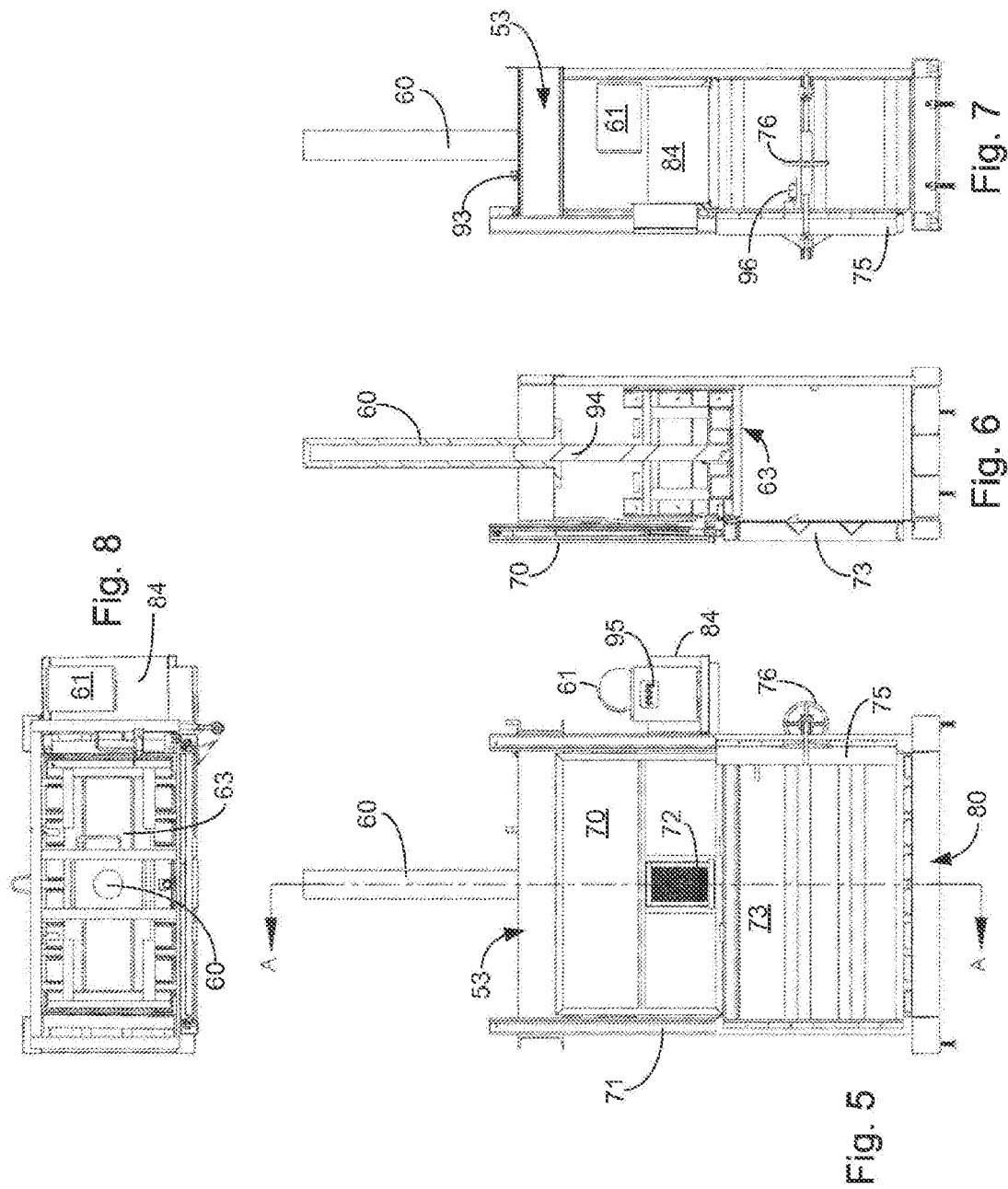

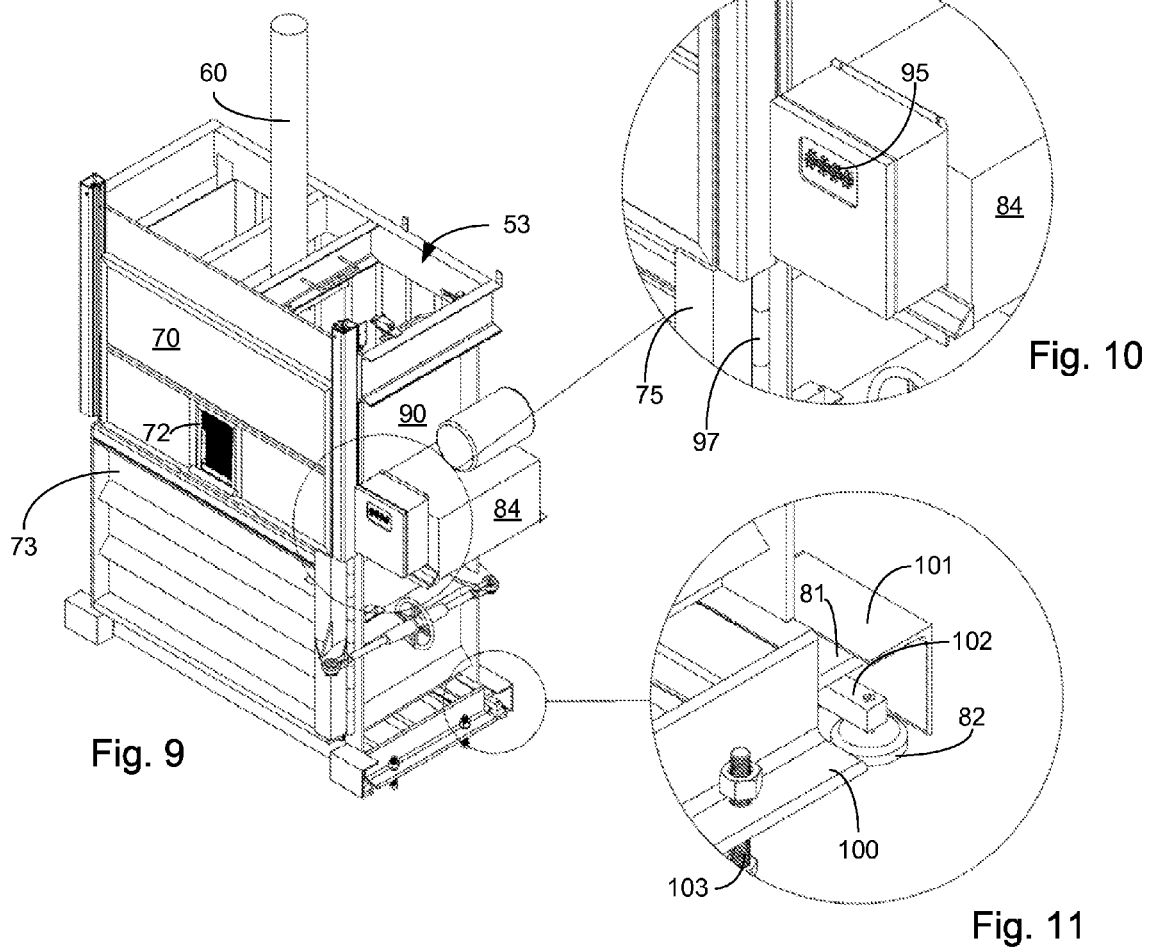

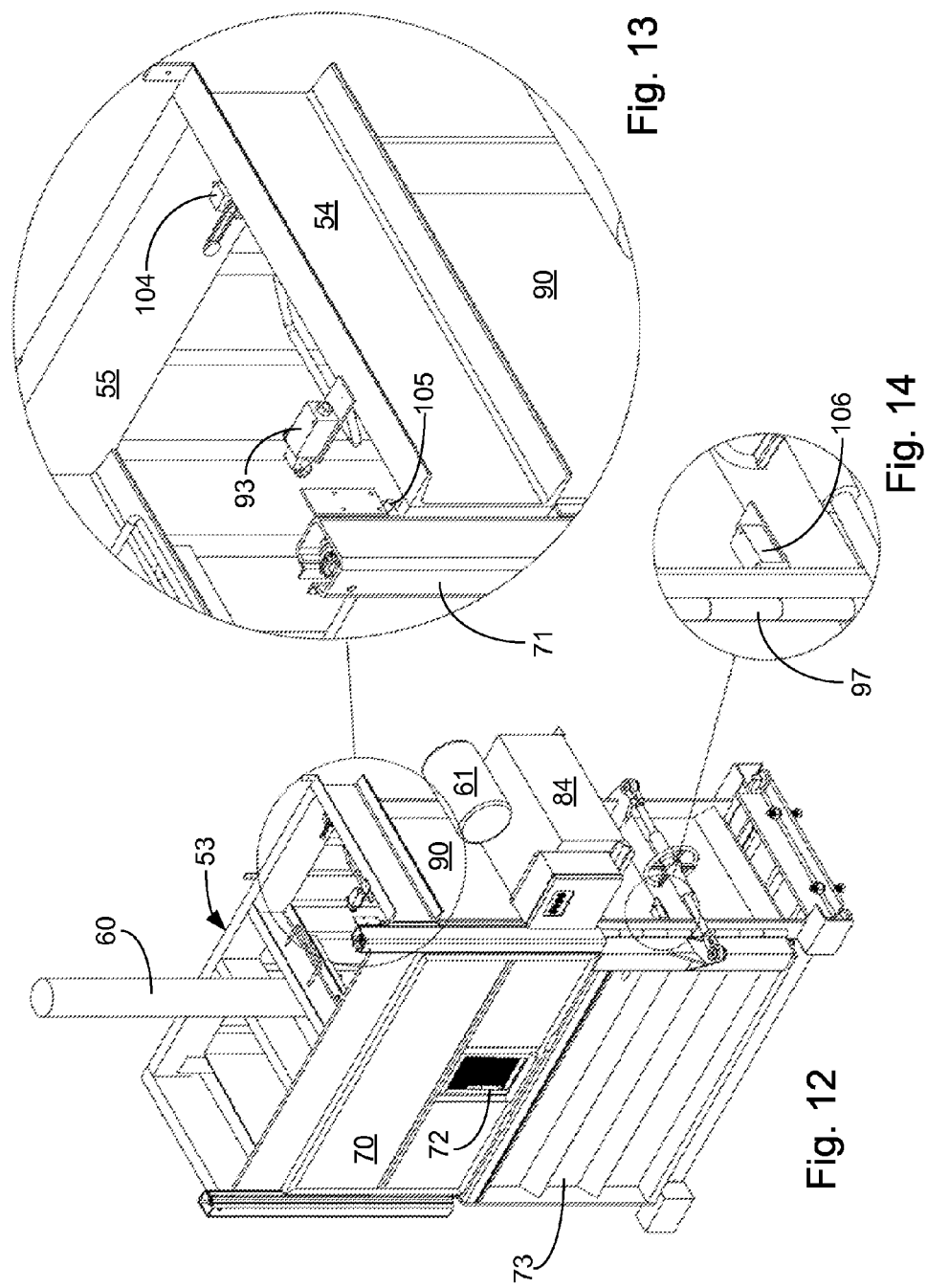

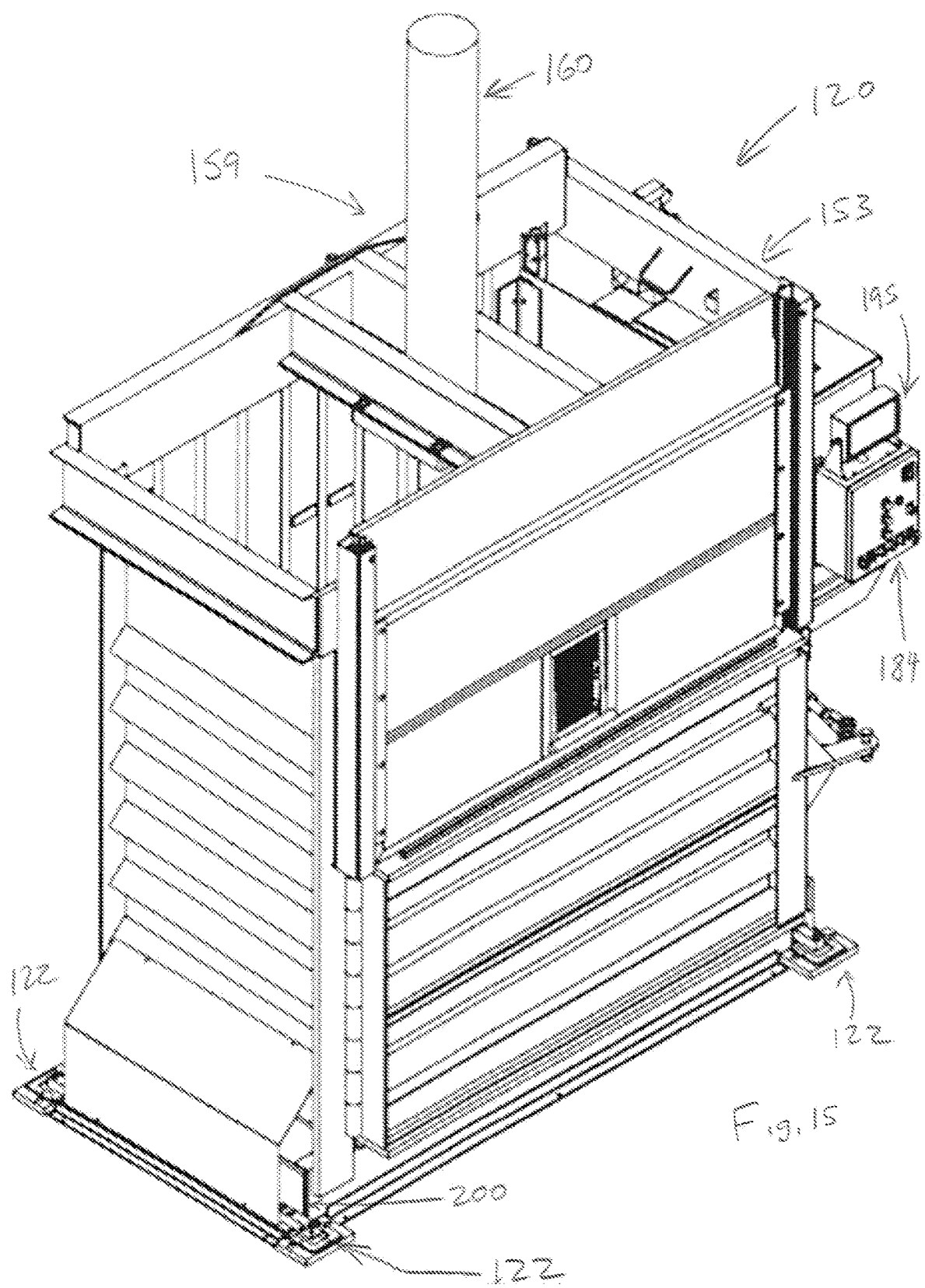

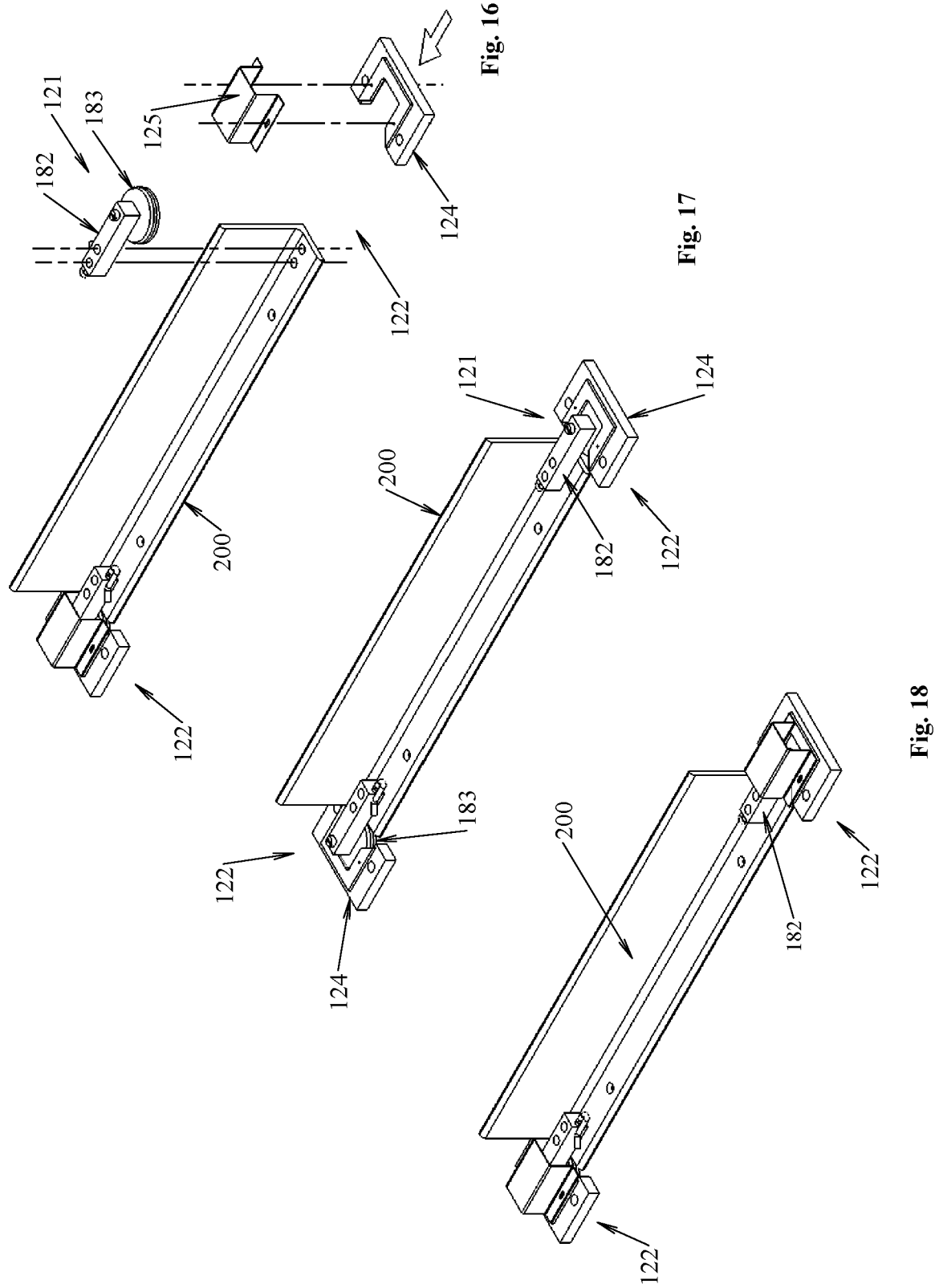

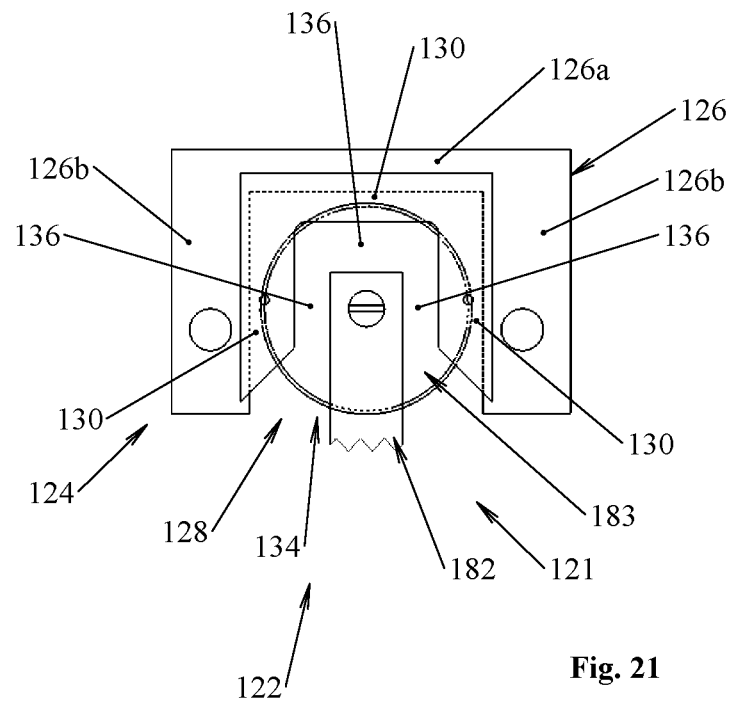
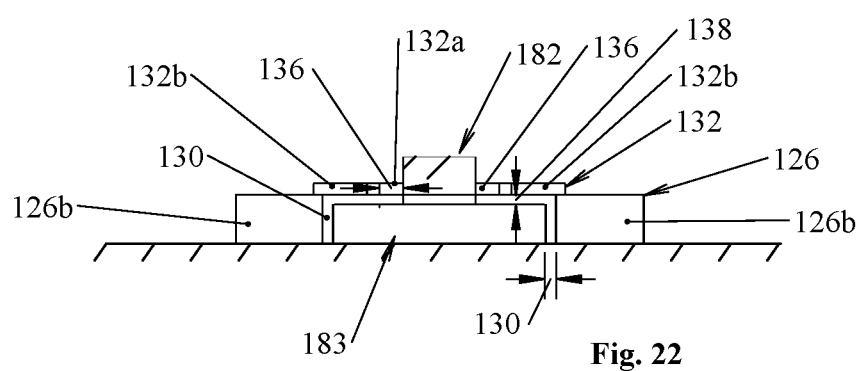
Fig. 21
Fig. 22

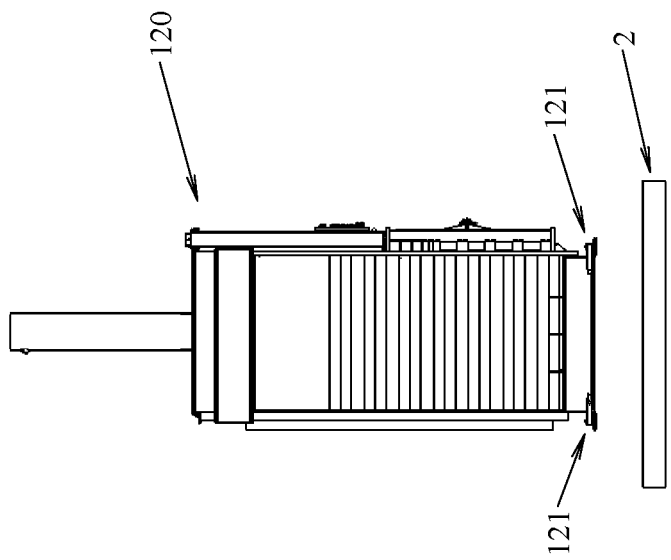
Fig. 25
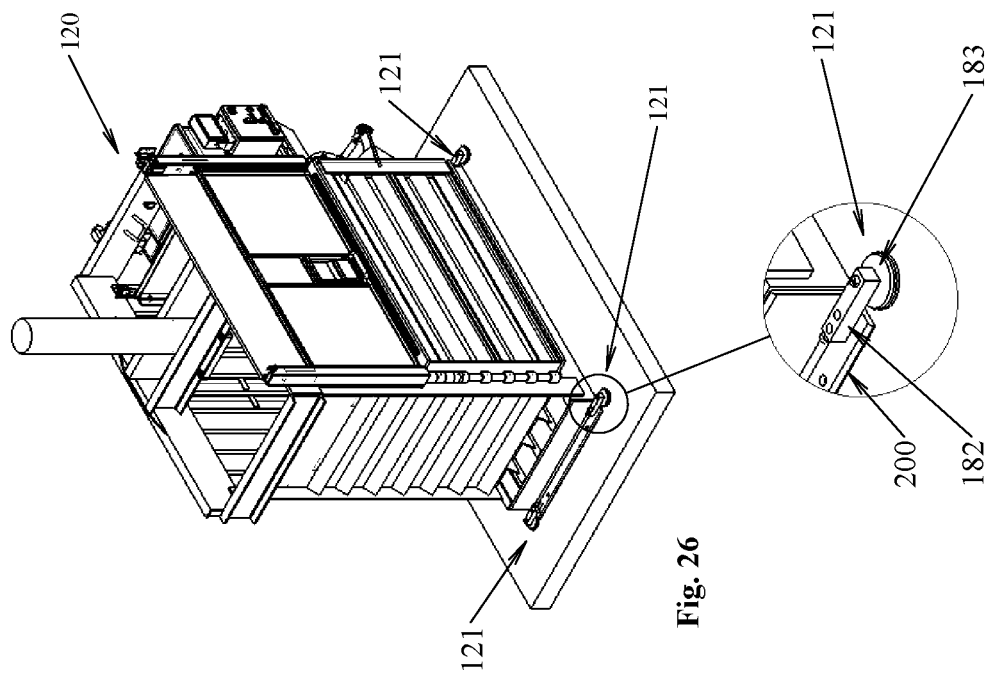
Fig. 26
Fig. 27

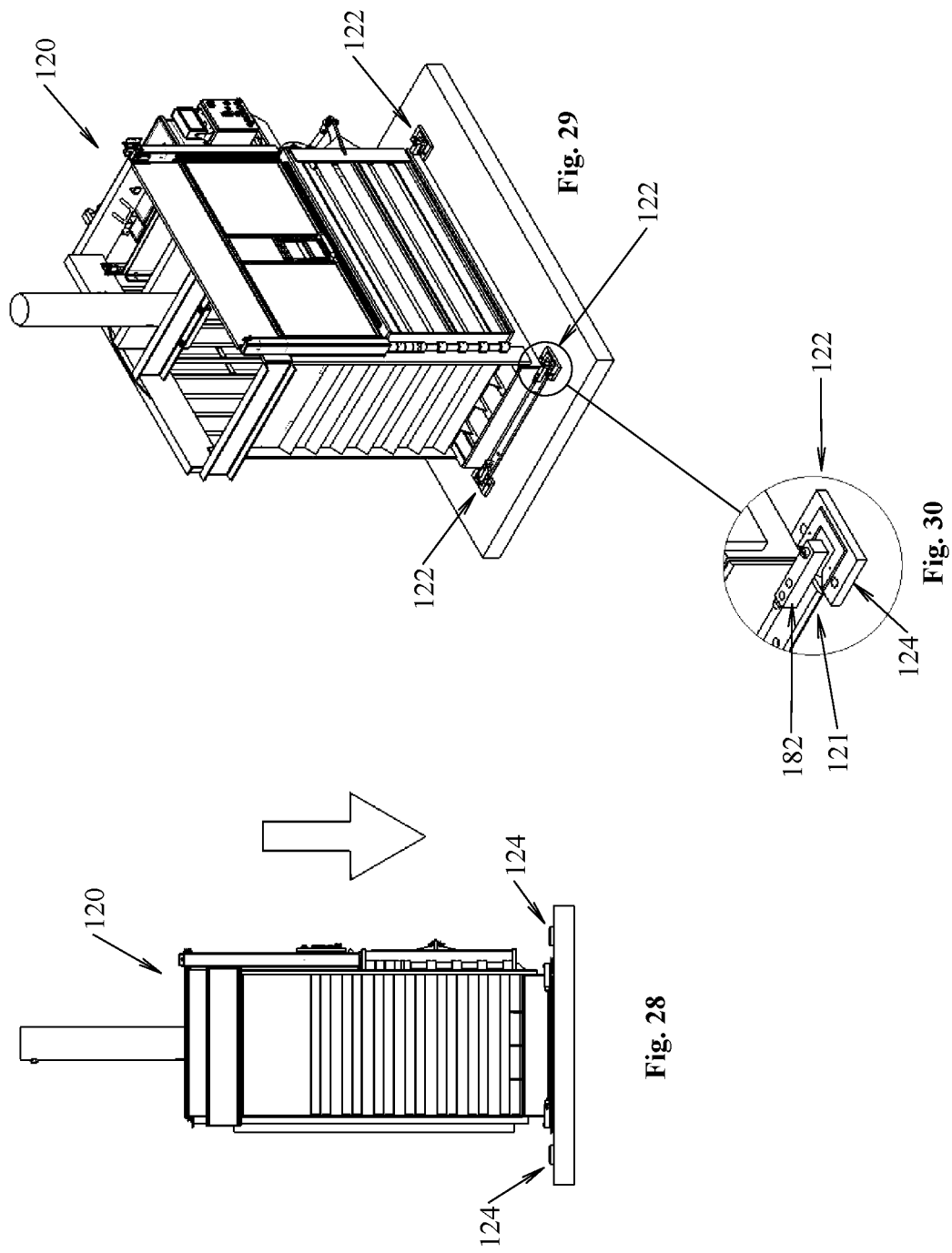

WEIGHT-MEASUREMENT RETROFITTING FOR RECYCLABLE-WASTE BALERS

CROSS-REFERENCE TO RELATED APPLICATION

This application is a continuation-in-part of U.S. Non-Provisional patent application Ser. No. 13/690,574, filed Nov. 30, 2012, and this application is a continuation-in-part of U.S. Non-Provisional patent application Ser. No. 15/483, 816, filed Apr. 10, 2017, which claims the priority benefit of U.S. Provisional Patent Application Ser. No. 62/319,868, filed Apr. 8, 2016, which is also a continuation-in-part of U.S. Non-Provisional patent application Ser. No. 13/690, 574, filed Nov. 30, 2012, all of which are hereby incorporated herein by reference.

TECHNICAL FIELD

The present invention relates generally to compacting and baling equipment for recyclable waste, and particularly to such recycling equipment for monitoring the contained waste for timely compacting and baling thereof.

BACKGROUND

Recycling is, of course, an activity rather than a composition per se. Thus, almost any item or material is "recyclable" in some fashion. That said, the most commonly recycled materials include old corrugated containers (OCC), paper, plastic, and non-ferrous metals (e.g., aluminum). The invention relates to any (or all) of these materials.

As an exemplary material, and at recent prices, "used" cardboard is worth approximately US$100-150 per ton. This makes its collection and recycling economically viable. According to some statistics, about 30 million tons of OCC were recovered in the US in 2011; i.e., worth about US$3-4 Billion. Similar statistics exist for other recyclable materials.

OCC is of interest because commercially, a large percentage (70-90%) of goods is shipped in some form of corrugated containers. Because of that, discarded boxes at retail establishments (e.g., grocery stores and volume retailers) represent a significant amount of OCC. Typically, the discarded boxes are temporarily compacted and baled at the retailer and then hauled away by a commercial waste company to a recycling center. At the recycling center, the cardboard is pressed and wrapped (i.e., rebaled) into bales that are sized for particular requirements such as transport in containers (i.e. container ships, container trailers) or for the input stream of a paper recycling mill.

Generally, the retailer does not have the capability for such a finalized baling, but instead uses a simpler, but less precise, baler. Because of that, the retailer is at the mercy of the hauler or recycling company in terms of calculating the amount (weight) of the collected cardboard material and the price that the OCC should command. Indeed, in many cases the hauler simply reports an unverified weight to the retailer, a weight that the retailer has no means of confirming. Given that grocery store chains and other retailers can generate huge amounts of discarded cardboard—even within local geographic areas—the total weight can reach thousands of tons per year, that in turn represent millions of dollars. Accordingly, a retailer's (or a retail chain's) loss of even a small percentage of the value of the collected discarded cardboard represents a relatively large economic disadvantage.

Stated positively, a sufficient economic incentive already exists and thus, the reward for recycling OCC (or any other relevant material) is potentially significant.

As another factor, because OCC material must be hauled from retailers to recycling centers, transportation costs and regulations (e.g., weight limits for commercial vehicles) also become an economic factor. An under loaded (or inefficiently loaded) truck wastes fuel resources while overloaded ones create regulatory and legal problems. As a result, the lack of precise information about OCC bales costs the retailer significant amounts, wastes transportation resources (thus effectively increasing transportation costs) and potentially violates state and federal laws.

In particular, a significant amount of OCC (or other baled recyclable material) is, at some point, hauled in steel intermodal containers (also referred to as "shipping containers," "sea containers," and "ISO containers"). A variety of such containers exist, and a common size is 40 feet long, 8 feet wide and 8½ feet high. The maximum load for this size container is typically about 30,000 kg (about 66000 pounds; about 33 tons). As those in the shipping business are aware, however, the exact sizes and weight capacities (or allowances) can differ from container to container and in some cases from shipper to shipper.

Regardless of exact sizes, using containers in the most efficient fashion requires filling up the volume and carrying the maximum weight. Stated differently, a shipped container that is less than full (either by volume or by weight) represents an inefficient use of resources and a resulting excess cost.

Currently, compacted OCC bales that (i) have dimensions of about 58.times.30.times.45" and (ii) weigh about 1250 pounds, may fill a standard container most efficiently. In current practice, however, the retailer does not produce such bales and instead relies on the hauler or recycler to produce the desired bales for further shipment or use.

As a result, bales of consistent size and weight can have more value than bales of random size and weight, particularly when the bales are intended for container shipping or export or both. The retailer loses this value (or a fraction thereof) when the retailer produces an informal bale.

In a corresponding manner, informal bales will not fill a shipping container by volume, or by weight. Because of that, a container that is shipped at less than full capacity reduces efficiency and increases cost by a factor related to the percentage of unused space or weight.

SUMMARY

Accordingly, in one aspect, the invention is a combination of a baler (compactor), a scale that weighs the recyclable material in the compactor at any point from the loading step to the finished compacted bale and independently of the force applied to the bale by the compactor, an identification system, and one or more processors (computers) that will bale to a required size on site (i.e., at the retailer), that will concurrently weigh the bale, that may assign an identifier (e.g. a barcode or RFID) to the bale, and then provide the selling retailer (and potentially other parties) with a highly accurate inventory of discarded, baled, sold, and transported recyclable material.

In another aspect, the invention is a recycling system that is particularly suitable for old corrugated containers (OCC) generated at a retail location. The system includes a baler for baling multiple pieces of OCC into generally fixed bales, a scale in weighing communication with the baler for weighing baled OCC produced by the baler, an identification system for adding specific identification to each bale produced by the baler, and at least one processor in signal communication with the baler, the scale and the identification system.

In another aspect, the invention is a weighed, identified bale of recyclable material that is ready for immediate container shipment or for a mill.

In another aspect, the invention is a recycling method that includes the steps of compacting recyclable material in a compactor into a bale while concurrently weighing the material in the compactor and independently of the force that the compactor applies to the material or to the bale, assigning an individual identifier to each fixed bale in which the identifier includes at least the weight of the bale, and generating an inventory of the baled recyclable material.

In yet another aspect, the invention is a recycling method that is particularly suitable for old corrugated containers (OCC) generated at retailers, that includes the steps of baling OCC into a fixed bale of OCC, weighing the fixed bale, assigning an individual identifier to the fixed bale in which the identifier includes at least the weight of the bale, and sending the fixed bale to a destination selected from the group consisting of shippers and mills (recycling, paper).

In still other aspects, the invention relates to a method of free-floating mounting of a baler or compactor that weighs the contained recyclable material independently of the force applied to the contained recyclable material by the baler or compactor, including for new installations and for retrofit applications, as well as a new anchor for use in such free-floating mounting methods and the resulting free-floating anchor-mounted baler.

The foregoing and other objects and advantages of the invention and the manner in which the same are accomplished will become clearer based on the followed detailed description taken in conjunction with the accompanying drawings.

BRIEF DESCRIPTION OF THE DRAWINGS

FIG. 5 is a front elevational view of a baler according to the invention.

FIG. 6 is a cross-sectional view taken along lines A-A of FIG. 5.

FIG. 7 is a side elevation overview of the baler according to the invention.

FIG. 8 is a top plan view of the baler of FIG. 5.

FIG. 9 is a perspective view similar to FIG. 3, and FIGS. 10 and 11 are enlarged cutouts of the indicated portions of FIG. 9.

FIG. 12 is another perspective view similar to FIGS. 3 and 9, with enlarged cutout portions that form FIGS. 13 and 14.

FIG. 15 is a perspective view of another baler according to the invention, showing the baler mounted in place in a free-floating manner by mounting anchors.

FIG. 16 is an exploded perspective view of a portion of the baler of FIG. 15, showing the baler mounting anchors, baler scale assemblies that are secured in the free-floating arrangement by the anchors, and a baler base frame member that the baler scale assemblies are mounted to.

FIGS. 17 and 18 show the baler portion of FIG. 16 in partially and fully installed/assembled configurations, respectively.

FIG. 21 is a plan view of a portion of the baler of FIG. 17, showing one of the baler scale assemblies mounted in the free-floating manner by one of the baler mounting anchors.

FIG. 22 is an elevation view of the baler portion of FIG. 21.

FIG. 25 shows the baler of FIG. 24 with the scale assemblies being installed in a next step of the retrofit method.

FIG. 26 is a perspective view of the baler of FIG. 25, with a detail portion enlarged to form FIG. 27.

FIG. 28 shows the baler of FIG. 25 with the baler lowered and now supported by the scale assemblies, and with the mounting anchors ready for installing, in a next step of the retrofit method.

FIG. 29 is a perspective view of the baler of FIG. 28, with the scale assemblies anchored in place in the free-floating arrangement in a next step of the retrofit method, and with a detail portion enlarged to form FIG. 30.

DETAILED DESCRIPTION OF EXAMPLE EMBODIMENTS

Figure 1:
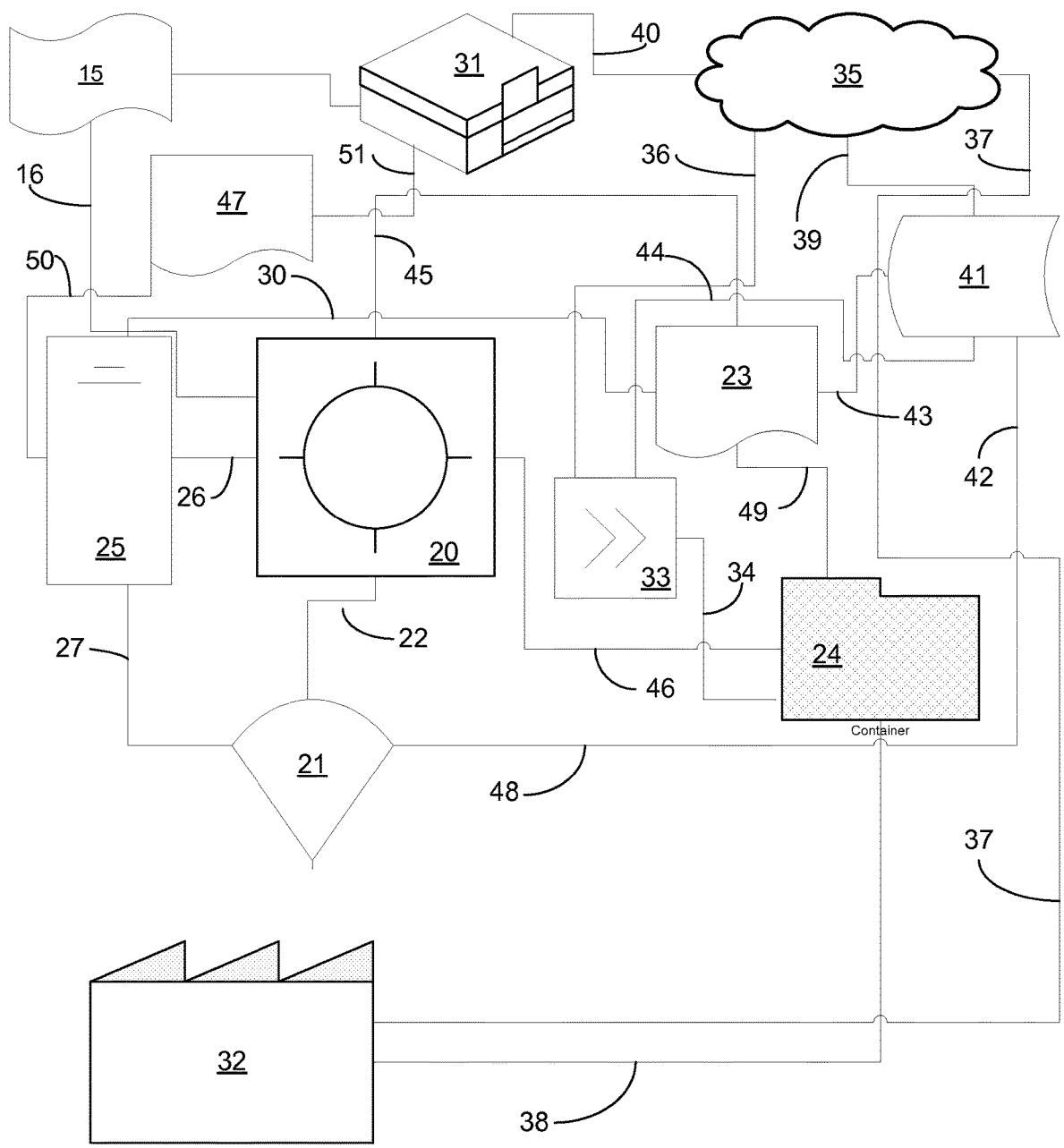
FIG. 1 is a flow diagram illustrating the method of the invention.

FIG. 1 is a schematic diagram illustrating various elements of the invention and the method of the invention. The invention is described in terms of old corrugated containers ("OCC") that are designated at 15 in the flowchart and that are placed or otherwise delivered to a baler 20.

As a point of nomenclature, a device that uses force (e.g., a press or a piston) to reduce the size of waste material such as OCC is typically referred to as a "compactor." In this specification, the terms "baler" and "compactor" are generally used interchangeably unless the context indicates a different use or distinction. "Baling" refers to the step—manual or automated—of wrapping the compacted waste material in some fashion that maintains its integrity for the most part as a geometric unit. Baling is typically carried out by wrapping the OCC with metal bands, or with high-strength polymer strips, or in some cases polymer wrap, or with some other appropriate material.

In the flowchart, the OCC 15 and the baler 20 are connected by the line 16. In actual practice this relationship can be as simple as having an operator deliver the OCC 15 to the baler 20, or the line 16 can represent a more sophisticated system (e.g. a conveyor) for delivering OCC to the baler 20. In the expected context of an individual retail location, it is likely that an operator will place the OCC 15 in the baler 20.

In most cases, the baling step is selected based upon the preference of the customer that will receive the bale. One typical technique is to hand wrap the compacted bale with 14 gage baling wire. This is typically available in precut lengths (e.g. 10 feet) and is sometimes covered with a protective plastic coating. A 14 gage wire can generally be tied by hand without significant difficulty.

In most circumstances, the compactor essentially forces the memory out of the materials such as plastic or cardboard during the compacting step. If the bale is tied relatively quickly after compacting, the return of the memory will cause the bale to expand against its tie and thus essentially tighten the bale.

In a first aspect, the method includes the step of baling the OCC 15 into a plurality of generally fixed bales of OCC and then weighing each bale. As will be described in somewhat more detail with respect to FIGS. 2-11, the baler includes a scale 21 that is in weight communication with the baler 20 for weighing the bale of OCC 15 produced by the baler 20. The term "scale" is used broadly to describe any device that weighs the bale, including devices that weigh the bale "in progress." In the embodiments illustrated in FIGS. 2-11 the weighing is carried out by one or more load cells 82 that are under the baler (e.g., FIG. 11) and electronically connected to the processor 25 by the communication line 27.

Figure 2:
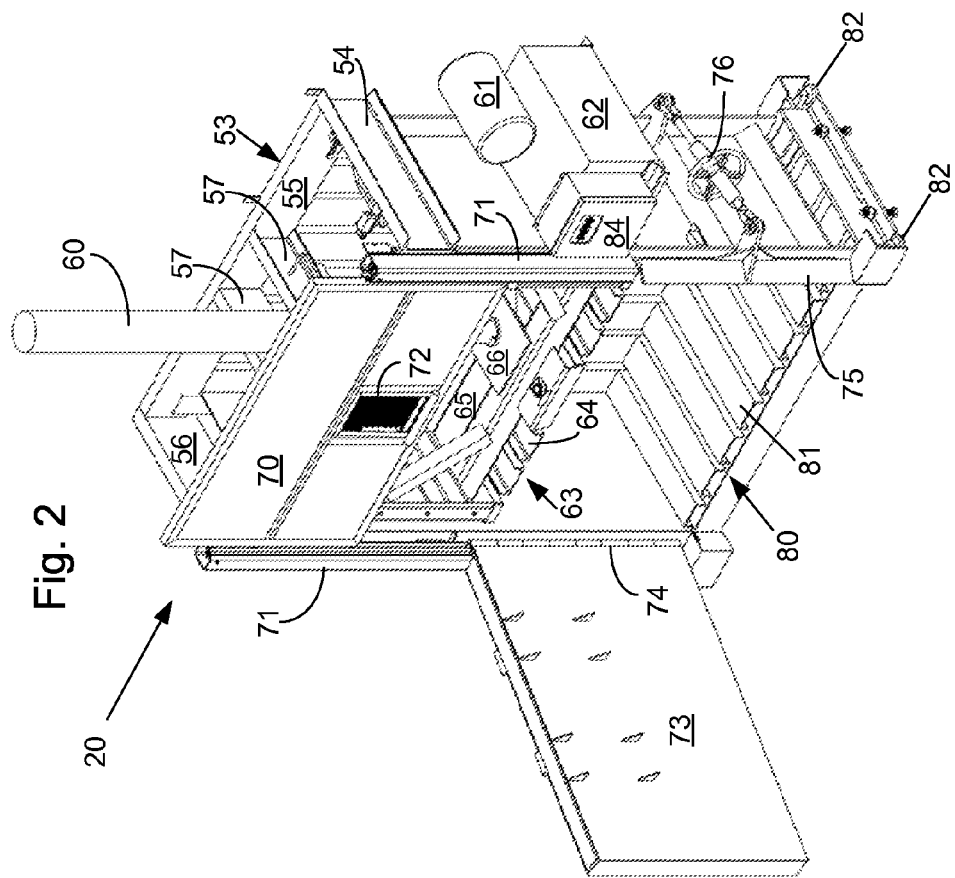

Because the load cells are under the baler (compactor), they can weigh the compactor and its contents while the compactor is compacting recyclable material and independently of the force that the compactor applies (e.g., cylinder 60, FIG. 2). Because the weight of the compactor 20 will generally remain constant, the difference in weight measured by the load cells will represent the weight of any added recyclable material.

An individual identifier is assigned to each fixed bale in which the identifier includes at least the weight of the bale from the scale 21. As will become clear from the further description herein, any identifier that can carry the required information and from which the required information can be reproduced or harvested is appropriate. In most current embodiments, the individual identifier will be some version of a radio frequency identification device ("RFID") or a machine readable label such as a barcode.

The term "barcode" is used in a broad sense and includes variation familiar to hose in the art such as "UPC," "EAN," and several others. In addition to individually naming (so to speak) a bale, these codes can include data about dates, measurements, locations, and many other types of information.

In FIG. 1, the identification system is indicated at 23 and an identified bale is indicated at 24. A processor 25 is in signal communication with the baler 20, with the scale 21, and with the identification system 23. Communication lines 26, 27 and 30 help illustrate these relationships. In the context of a plurality of bales, the method includes generating an inventory of the baled OCC material using the processor 25 and appropriate memory. The processor can be any appropriate device that has the calculating and memory sufficient to handle the steps of the invention. Typically, it includes a programmable logic controller (PLC) that can be programmed by the user. Many current types of PLC's can be programmed through a connection (e.g. Ethernet) to a personal computer and thus PLC's appropriate for the invention can be selected, programmed and used by those skilled in the art, and without undue experimentation.

In the method, the OCC is baled into a plurality of bales of similar fixed weight, or of similar geometry, or of both similar weight and similar geometry. Because of the nature of OCC, and of baling and recycling in general, the term "fixed weight" will be understood to include an appropriate tolerance or uncertainty rather than the level of precision that might be expected, for example, in bench top chemistry experiments. In some embodiments, the method comprises adding the OCC 15 to the baler 20 until the baler 20 and it's scale 21 detect a desired bale wait of OCC, and then producing a bale from that amount of OCC.

It will be understood, of course, that although the method is particularly advantageous for multiple bales and large amounts of OCC, the method also applies to a single bale.

In the same manner, the invention can include, either in conjunction with the weight or independently of it, baling the OCC 15 into a plurality of bales of similar fixed shape. The most typical shape is a solid rectangle (again used generally with an understood tolerance) and an advantage of the invention is that it will produce the bale in a size and weight that is considered mill-ready. Although the term "mill-ready" is to some extent subjective, it is understood in the industry to represent a solid rectangle that weighs at least about 800 pounds, or in some cases at least 1000 pounds, and in many cases over 1200 pounds. Similarly, the bale will have dimensions on the order of about 60 inches on at least one of its sides (length width or height). As noted in the background, bales having dimensions of 58.times.30.times.45 inches (about 147.times.76.times.114 centimeters) are most efficiently-sized for filling typical shipping containers with little or no wasted space. Additionally, if such bales weigh about 1250 pounds (about 568 kilograms) each, they will match (or nearly match) the 30,480 kg (67,056 pound) weight limit. Using the maximum space and weight in turn maximizes the efficient use of a plurality of containers, including the most efficient use of energy to transport the containers and the proportionally lowest cost.

FIG. 1 also illustrates that one of the advantages of the invention is the use of the baler 20 at the site of the retailer 31 at which the OCC is being generated. As indicated in the background, the general advantage of the invention is to produce bales that can be transported to, and used at, a final destination without any rebaling step. FIG. 1 illustrates the destination as the mill (or buyer or shipper) 32, and the transportation to the mill 32 is indicated by the line 38. FIG. 1 is, of course, exemplary rather than limiting of the invention, and the destination is not limited by the terminology used herein.

In some circumstance, some (rather than all) of the bales are identified, labeled, and tracked. Stated differently, a method that bypasses one or a few bales from a plurality of bales still falls within the invention.

Furthermore, because the bales 24 carry the individual identifiers, the method can include reading the location of the bales using the bales' individual identifiers after the bales leave the retail site. This step is illustrated in FIG. 1 by the detector 33. The detector 33 is appropriately complementary of or congruent with the type of identification used in the bale 24. Thus, if the bale is identified with an optical label such as a barcode, the detector 33 will be an optical scanning device that will recognize the barcode and interpret (and store and send) the information provided by the barcode.

Alternatively, if the identification system is RFID, the detector will either pick up the signal from the RFID or broadcast a signal to which the RFID responds. The relationship between the detector 33 and the identified bale 24 is indicated by the connecting line 34.

RFID devices are helpful because in most circumstances they eliminate the need for a data entry step. Their use and operation are generally well understood in the art and can be adopted by those of ordinary skill without undue experimentation. Some RFID tags are "passive" meaning that they have no internal power source, but draw power from the detector. Active tags contain a battery for power and some tags combine both passive and powered features. RFID tags have the advantage of not needing to be within the line of sight of a particular optical reader and thus can be embedded in the bales.

Bar-code labels or other similar indicators, however, have different advantages. Such labels are typically much less expensive than RFID tags and a plurality of data sources can be placed on the same object. Additionally, barcodes or other optical labels can be generated and distributed electronically; for example by email or to mobile devices.

In order to provide the relevant information to the interested parties, the information from the detector 33 is sent to the retailer 31, the mill 32 or both. As illustrated in FIG. 1, this is most conveniently carried out using the Internet which in turn is symbolized by the cloud 35.

The use of the Internet 35 is, of course, convenient rather than mandatory, but the ubiquitous nature of the Internet and the ease of electronic communications make its use convenient and helpful. Connecting line 36 illustrates the flow of information from the detector 33 to the Internet 35 and line 37 similarly indicates the flow of information from the Internet to the mill 32. Line 40 indicates the flow of information from the Internet 35 to the retailer 31.

FIG. 1 also illustrates that the relevant identification data 41 is generated by the scale 21 and by the identification system 23. The data 41 arrives from (or its path is symbolized by) the scale 21 through the line 22 and with the identification system by the line 43. On a periodic basis, information and identification data are produced by the detector 33 as indicated by the line 44 connecting the detector 33 to the data 41.

In a similar manner, the relationship between the baler 20 and the identification system 23 is indicated by the line 45 and the relationship between the baler 20 and the identified bale 24 is indicated by the line 46. The relationship between the scale 21 and the identification data 41 is indicated by the line 42, and between the data 41 and the Internet 35 by the line 39. Line 49 represents the relationship between the bale 24 and the identification system 49.

FIG. 1 also shows that the processor 25 can also provide information 47 to the retailer early in the process, a relationship indicated by the connecting lines 50 and 51.

Although FIG. 1 illustrates several of these potential communication relationships, it will be understood that FIG. 1 is exemplary rather than limiting of this capability. Accordingly, the invention can include other paths of communication between and among the retailer, the bale, the mill, the transporter (shipper) and the Internet.

FIG. 2 is a perspective view of a baler 20 that includes aspects of the present invention. The baler 20 includes a frame broadly designated at 53 that is typically form of an appropriate metal, usually steel. The frame 53 has a number of structural elements such as the girders 54, 55, and 56 at the top. A pair of parallel reinforcing girders 57 helps support a main compaction cylinder 60 which is typically a hydraulic cylinder. The main compaction cylinder 60 is connected to hydraulic fluids through appropriate hydraulic lines (which have been omitted from FIG. 2 for clarity). The hydraulic cylinder includes a piston 94 (FIG. 6) driven by the motor 61 and obtains fluid from, and is controlled by, a tank and control housing 62.

The main compaction cylinder 60 is attached to a press head assembly broadly designated at 63. In the illustrated embodiment, the press head assembly is formed of a plurality of press head plates 64. These are connected to the main compaction cylinder 60 by the crosspiece 65 and the plate 66.

The compactor 20 includes a vertically oriented gate 70 that reciprocates vertically between two gate guide tube assemblies 71. The gate 70 includes a smaller portal 72 through which an operator can observe the status of the compaction and of any resulting bale. The gate 70 is typically raised in order to add OCC and lowered (closed) for the compacting step.

In order to remove the bale from the compactor 20, a door 73 is included in the lower half of the baler 20. The door 73 is mounted on a door hinge 74. When the compactor is in operation the door is closed (e.g., FIG. 3) and held in place by a door latch 75. The door latch 75 pivots on a hinge 97 (FIG. 14) and is in turn is opened and closed by the turnbuckle 76 which moves on its own hinge 77.

The floor of the baler 20 is broadly designated at 80 and in the illustrated embodiment is formed of a plurality of floor plates 81.

Although illustrated in more detail in FIG. 11, FIG. 2 also illustrates a pair of load cells 82. In the illustrated embodiment, a total of four load cells are positioned beneath the main frame 53 and are operatively connected to the controller and display 84.

Figure 3:
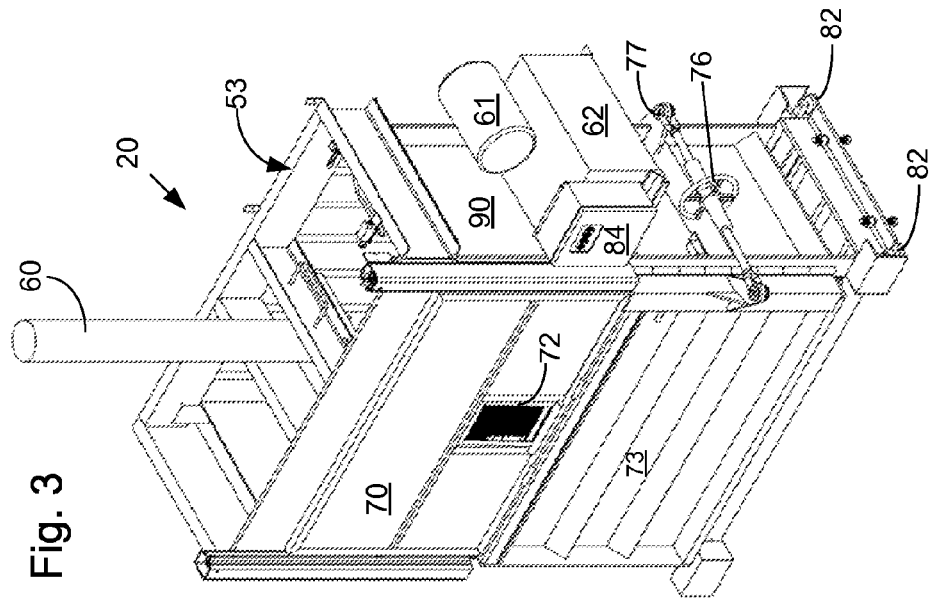
FIGS. 2 and 3 are perspective views of a baler according to the invention.

FIG. 3 illustrates the same baler 20 and thus the same structural and operational elements as FIG. 2, but with the gate 70 lowered and the door 73 closed and latched.

Figure 4:
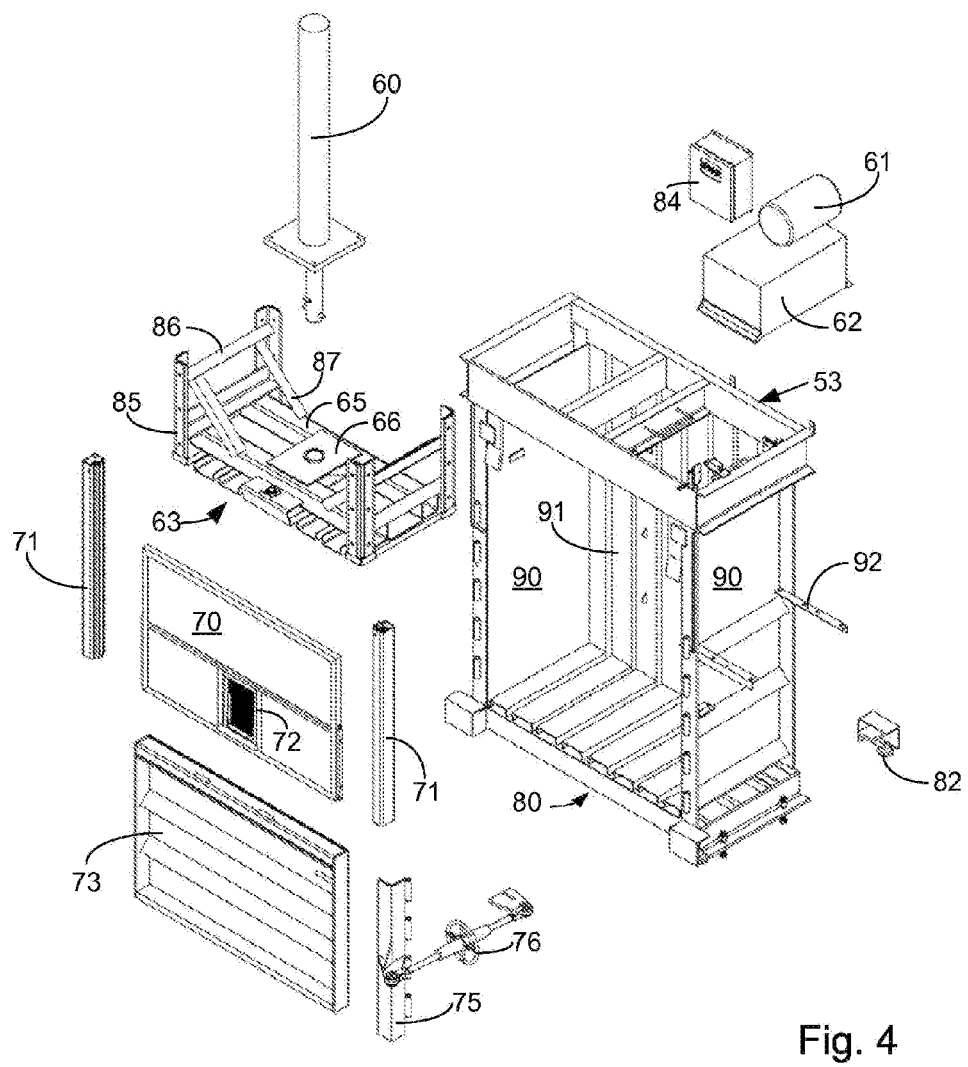
FIG. 4 is an exploded view of the perspective views of FIGS. 2 and 3.
Figure 19:
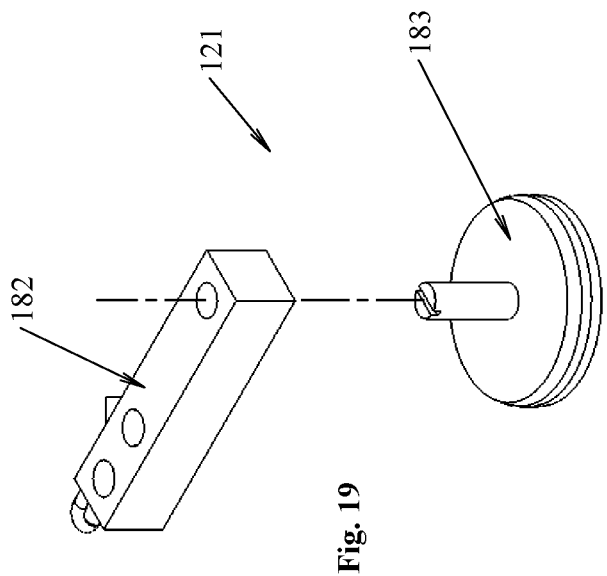
FIG. 19 is an exploded perspective view of one of the baler scale assemblies of FIG. 16.
Figure 20:
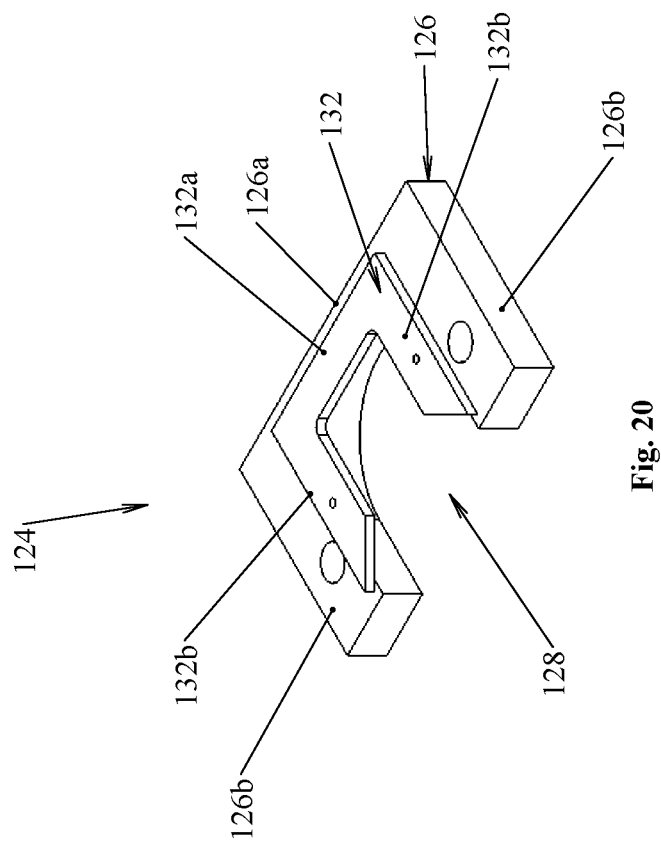
FIG. 20 is a perspective view of one of the mounting anchors of FIG. 16.

FIG. 4 is an exploded view of the same baler 20 illustrated in FIGS. 2 and 3. Thus, the elements are the same, with FIG. 4 helping to illustrate a few more structural elements. FIG. 4 illustrates that in addition to the cross pieces 65 and the plate 66, the press head assembly 63 includes vertical bars 85 and horizontal bars 86 that are further joined and supported by the crossbars 87.

FIG. 4 also illustrates that the frame 53 includes side panels 90 and a rear panel 91. A pair of control support bars 92 extend from the side panel 90. FIG. 4 also illustrates a limit switch 93 (best seen in FIG. 13) that is typically one of several present for monitoring various positions of (for example) the press head assembly 63 as it reciprocates vertically.

FIGS. 5-8 are additional elevational, plan and cross-sectional views of the baler 20. These figures illustrate a number of items that have already been described, and thus they carry the same reference numerals. FIG. 6 illustrates that the main compaction cylinder 60 includes a piston 94 that reciprocates within the cylinder 60. FIG. 5 includes a somewhat clearer view of the digital display 95 on the controller 84. FIG. 7 illustrates another limit switch 96 positioned lower in the baler 20 than the limit switch 93 illustrated at the top.

FIG. 9 is identical to FIG. 3, but includes the cut out expanded views of FIGS. 10 and 11. FIG. 10 illustrates the controller 84 and its digital display 95. FIG. 10 also illustrates the hinge 97 for the door latch 75.

FIG. 11 shows the rear load cell 82 and its surrounding structure. The structure includes a side angle iron 100, a small portion of the floor plate 81, another angle iron 101 that serves as a load cell cover, and a load cell arm 102 that transfers force from the floor plate 81 to the load cell 82. FIG. 11 also illustrates that the side angle iron 100 is fixed to several anchor bolts 103, two of which are visible in FIGS. 3 and 9. As the skilled person will recognize, both the weight of the baler and its reciprocating motion require that the baler be firmly anchored in place, and the anchor bolts 103 are thus typically fixed directly to a structural floor (or equivalent element) that can handle the forces generated when the baler is in operation.

FIGS. 12, 13, and 14 illustrate several other details. FIG. 12 is identical to FIG. 9 and FIG. 3. The enlarged view of FIG. 13 illustrates that the limit switch 93 is an up stop limit switch. FIG. 13 also illustrates a full bale limit switch 104 and a safety gate limit switch 105.

FIG. 14 illustrates a main bale door limit switch 106.

Turning now to FIGS. 15-30, there are shown additional embodiments of the invention. FIGS. 15-22 show a baler equipped with scale assemblies supporting the baler and with mounting anchors securing the scale assemblies in place in a free-floating arrangement, and FIGS. 23-30 show a method of equipping the baler with the scale assemblies and the mounting anchors in retrofit or new installations. As such, various aspects of the invention relate to free-floating weighing/mounting systems for use with balers, balers including free-floating weighing/mounting systems, and methods of mounting balers in a free-floating arrangement.

FIG. 15 shows a waste-containment system including a baler 120 equipped with a free-floating mounting system 122 according to an example embodiment of the invention. The baler 120 can be of the same general type as that described above and/or commercially available from BACE, LLC (Charlotte, N.C.), so additional structural and operational details are not needed for a complete understanding of the invention, and so such additional details are not included here for brevity. Having said that, the free-floating mounting system 122 can be used with other designs and types of balers and compactors, including those for storing and compacting so basic structural and functional details are described herein. As noted above, the terms "baler" and "compactor" are generally used interchangeably herein, and because both types of equipment provide a compacting function they can be collectively referred to as "compacting machines." Also, various aspects of the invention can be implemented in waste-containing equipment that does not provide a compacting function and/or that stores non-recyclable waste, including dumpsters and open-tops, and these non-mechanized units and compacting machines can be collectively referred to waste containers.

The baler 120 includes a waste-containing chamber, a compaction system, and a control/communication system. The waste chamber is formed by a main frame 153 including structural members and panels mounted to the structural members. The compaction system includes one or more press-head plates driven by a main compaction drive (e.g., cylinder) 160 through a compacting motion within the waste chamber. And the control/communication system includes a controller 184 for basic processing and control functionality, a digital display 195 for input and output functionality, and communications components (e.g., a transceiver and antenna) for communicating with remote programmed computer equipment (e.g., an identification system as described above for use in the recycling methods described above, or a scheduling system for emptying the waste upon it reaching a predefined maximum weight for example as disclosed in U.S. Non-Provisional patent application Ser. No. 15/483, 816, filed Apr. 10, 2017, which is incorporated herein by reference).

Referring additionally to FIGS. 16-22, the baler 120 includes innovative free-floating weighing/mounting assemblies 122 that support and weigh the baler 120 and that secure the baler 120 in place, all while at the same time providing a free-floating arrangement so that the baler 120 weighs the contained recyclable material independently of the force applied to the contained recyclable material by the baler. In the depicted embodiment, the baler 120 includes scale assemblies 121 and mounting anchors 124. The scale assemblies 121 mount to the baler main frame 153, support the weight of the loaded baler 120 (including its recyclable waste contents) on the floor, ground, or other support surface, and measure the supported weight (for example, before, during, and/or after compaction). And the mounting anchors 124 secure the scale assemblies 121, and thus the baler 120, in place to the support surface in a free-floating arrangement.

In particular, as the baler 120 is filled with waste materials, the scale assemblies 121 measure the weight of the balers 120 and the contained waste by deflecting or otherwise deforming under that load. And as increasing amounts of waste are added, the deformation of the scale assemblies 121 becomes more pronounced, and restricting that deformation tends to interfere with and adversely affect the accurate weight measurement of the loaded baler 120 by the scale assemblies 121. Furthermore, the forces created by the compaction system operating through its compacting operation within the waste chamber will tend to be quite significant (as required for compacting the recyclable material), these forces will tend to be transmitted to and create stresses and strains on the baler main frame 153, and these transmitted forces will in turn be transmitted to the scale assemblies 121 supporting the baler 120, with these forces then possibly interfering with and adversely affecting the accurate weight measurement of the loaded baler 120 by the scale assemblies 121. But the mounting anchors 124 secure the scale assemblies 121 in place in the free-floating arrangement that permits the scale assemblies 121 freedom of movement to deflect or otherwise deform vertically in an upward direction and horizontally in all four lateral directions. That is, the mounting anchors 124 are oversized relative to the scale assemblies 121 to leave at least a relatively small spacing in all these directions, thereby permitting at least slight vertical and transverse deflecting movement of at least a portion of the scale assemblies 121 to alleviate and dissipate the transmitted forces so they do not distort the weight measurements.

In the depicted embodiments, for example, four of the scale assemblies 121 are mounted to two base frame members 200 of the baler main frame 153 with the scale assemblies 121 supporting the baler 120. In other embodiments, the scale assemblies can be mounted to other structural elements of the baler main frame 153 and/or other numbers of the scale assemblies can be included.

As noted above, the scale assemblies 121 support the entire weight of the loaded baler 120 on the support surface (e.g., floor or ground) and measure that weight. In the depicted embodiment, the scale assemblies 121 each include a weight sensor 182 mounted to and extending (e.g., laterally) from the baler main frame 153 to provide the weighing functionality, and a support foot 183 mounted to and positioned under the weight sensor 182 to support the load cell 182. The mountings of the weight sensors 182 to the baler frame 153, and the support feet 183 to the weight sensors 182, can be by conventional fasteners such as bolts secured in bolt-holes and/or other threaded connections. And the support feet 183 can be of a conventional type for example the depicted disk-shaped polymeric feet that are commercially available from Rice-Lake Weighing Systems (Rice Lake, Wis.), though other support feet such as blocks, plates, and/or pads (of the same or other materials, and of the same or other regular or irregular shapes) can be suitably used to provide the needed supporting functionality, as will be readily understood by those of ordinary skill in the art.

The weight sensors 182 can be provided by strain-gauge load cells of a conventional type, for example the depicted shear-beam load cells with each having a first end mounted to the baler 120 and a second/opposite end mounted to the respective support foot 183. In typical commercial embodiments, the shear-beam load cells 182 are rated at 3.0 mVN output with a 10,000 pound capacity, and made primarily of nickel-plated or stainless steel (or another material selected for strength and durability), though many different units can be suitably employed based on the given application. Also, the shear-beam load cells 182 typically include wiring and/or a connector for connecting the wiring in hard-wired embodiments (see FIG. 19). Load cells 182 that are suitable for (or can be readily modified for) this use are commercially available from Measurement Systems International (Seattle, Wash.), a division of Rice Lake Weighing Systems Company (Rice Lake, Wis.). In other embodiments, other types of weight sensors can be used, including other types of load cells such as compression, double-ended shear beam, and/or bending beam designs, with suitable units known in the art and commercially available from various known manufacturers.

In use, the weight placed into the baler 120 pushes down on the load cells 182, with this force substantially absorbed by and generating deflection of the load cell 182. This deflection is converted into an electrical signal that is directly proportional to the deflection and thus corresponds to and is read as a weight. This measured weight data is then transmitted via the control/communications systems to remote computer equipment for use in determining the waste weight (the measured weight of the loaded baler minus the fixed known weight of the empty/unloaded baler 120). This measured weight data can also be transmitted via the control/communication system to other electronic devices for use by a service-providing company, a waste-generating user of the baler 120, and/or another interested entity such as those described herein.

As noted above, the innovative mounting anchors 124 secure the scale assemblies 121, and thus the baler 120, in place in the free-floating arrangement. That is, the scale assemblies 121 are not rigidly and fixedly locked in position by the mounting anchors 124 with absolutely no movement permitted, but instead are permitted at least slight freedom of movement vertically in an upward direction and horizontally in all four lateral directions while still being constrained from being removed from the location of intended use of the baler 120. Thus, the free-floating mounting arrangement enables not just vertical positional adjustments in scale assemblies 121 motion but also lateral ones.

In the depicted embodiment, the mounting anchors 124 each have a generally U-shaped base or body 126, with a main or transverse segment 126a, with two spaced-apart extension or leg segments 126b extending from opposite end portions of the transverse segment 126a, and with the three base segments cooperating to form a recess 128 that receives the support foot 183. The base recess 128 is slightly oversized laterally relative to the support foot 183 to provide a loose fit such that there is a lateral spacing 130 between the support foot 183 and each of the three base segments.

In addition, the depicted mounting anchors 124 each have a generally U-shaped retainer or top 132, with a main or transverse segment 132a, with two spaced-apart extension or leg segments 132b extending from opposite end portions of the transverse segment 132a, and with the three retainer segments cooperating to form a recess 134 that receives the load cell 182. The retainer recess 134 is slightly oversized laterally relative to the load cell 182 to provide a loose fit such that there is a lateral spacing 136 between the load cell 182 and each of the three retainer segments. And the retainer 132 is positioned slightly spaced apart from and above the support foot 183 so that the base recess 128 is slightly oversized vertically relative to the support foot 183 to provide a loose fit such that there is a vertical spacing 138 between the support foot 183 and each of the three retainer segments.

The retainer 132 and the base 126 of the mounting anchor 124 can be separate pieces attached together by conventional fastening elements (e.g., as depicted) or they can be integrally provided as a single part. The retainer 132 and the base 126 can be in the form of plates (e.g., as depicted) or other structural elements such as bars and/or rods, and can be made of metal or another material selected for strength and durability. In addition, the mounting anchor 124 can include a guard 125 that mounts covering the scale assembly 121, or at least over the lead cell 182, for protective purposes.

The lateral spacings 130 and 136 and the vertical spacing 138 are typically small (e.g., relative to the size of the load cells 182) and on the order of magnitude of the deflection of the load cells 182 (FIGS. 21-22 are for illustration purposes and not to scale). For example, in some embodiments the lateral spacing 130 is about ⅛ inch to about inch, the lateral spacing 136 is about % inch to about A inch, and the vertical spacing 138 is about ⅛ inch to about % inch. In this way, as the significant forces generated by the increasingly heavier and heavier loads of waste in the baler 120 are transmitted to the load cells 182 and thereby bias them into more and more displacing/deflecting slight movement, there remains slight freedom of movement for the load cells 182 to so deflect or otherwise deform under the forces resulting from the weight load of the baler 120 (including the contained recyclable waste materials), with additional deformation from force from operation of the compacting mechanism tolerated in embodiments with slightly larger spacings. But at the same time, the base 126 and the retainer 132 provide mechanical interference that blocks the support feet 183 and/or the load cells 182 from moving more than the small distances of the spacings 130, 136, and 138 so the baler 120 cannot not move or be moved away from its intended location of use. And in keeping with this, the lateral spacing 130 for the support foot 183 is typically smaller than the lateral spacing 136 for the load cell 182 so that any lateral constraint is from mechanical interference with the support foot 183 and not the load cell 182.

In addition, with the U-shaped, three-legged, recessed design of the mounting anchor 124, the fourth lateral side and the bottom side are open to provide communication with the recesses 128 and 134. In this way, the mounting anchors 124 can be moved downward and laterally onto the scale assemblies 121 when the baler 120 has already been outfitted with the scale assemblies 121, making them suited for retrofit or new installations (as described in more detail below).

In other embodiments, the anchor base has only two segments forming an angle (e.g., a right angle with one of the three above-described leg segments excluded), with each right-angle anchor oriented relative to the other so that they collectively form the four corners of a rectangle and thereby provide the minimal lateral spacing and the constraining functionality for the scale assemblies. In other embodiments, the anchor retainer has only one transverse segment (e.g., a generally linear strip or bar) extending across the U-shaped body (the retainer can be for vertically constraining the support foot 183 and not for laterally constraining the load cell 182) and/or the retainer is provided by bars, latches, clamps, or other conventional elements to provide the minimal vertical spacing and the scale-constraining functionality (though only across an outermost portion of the support feet).

In the above-described embodiments, the mounting anchors 124 mechanically constrain the support feet 183 of the scale assemblies 121, though in other embodiments they can be adapted to constrain the load cells 182 or other weight sensors. Such embodiments include designs with the lateral freedom of movement provided between the support foot and the load cell, for example with an oversized connection hole in one part receiving a post (including a stud or bolt) of the other part with a loose fit and thus with the lateral spacing, and with the support foot considered part of the mounting anchor. Similar designs can be used for proving the vertical freedom of movement and spacing. Also, in some embodiments, the anchor base has a height that is sufficiently great that the retainer can be eliminated, with the base height sufficient that the scale assemblies cannot "jump" out of them, and with the lack of a top constrain enabling the vertical freedom of movement functionality.

Referring now to FIGS. 23-30, in another aspect the invention relates to a method of upgrading a baler 120 to provide capabilities for weighing the contained recyclable material independently of the force applied to the contained recyclable material by the baler 120. The method can be used with the balers disclosed herein or other balers as may be desired. And the method is described herein with reference to retrofit installations, that is, performing an in-the-field or on-site upgrade of an existing baler to enable the weighing and communications functionality, but it can be readily adapted for use in new installations, that is, when installing a new baler equipped for providing the weighing and communications functionality.

Figure 23:
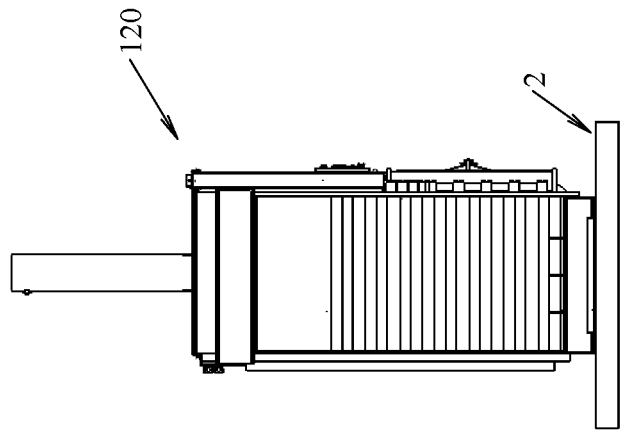
FIG. 23 is an elevation view of a baler of FIG. 15 shown in a first step of a retrofit method according to the invention.

FIG. 23 shows an existing baler 120 installed on site for use and mounted on a support surface 2, with any existing anchoring (e.g., bolts secured into the support surface) having been removed as a preliminary step of the method. Also, control/communication system components can be installed now or at a later stage in the process, as may be needed.

Figure 24:
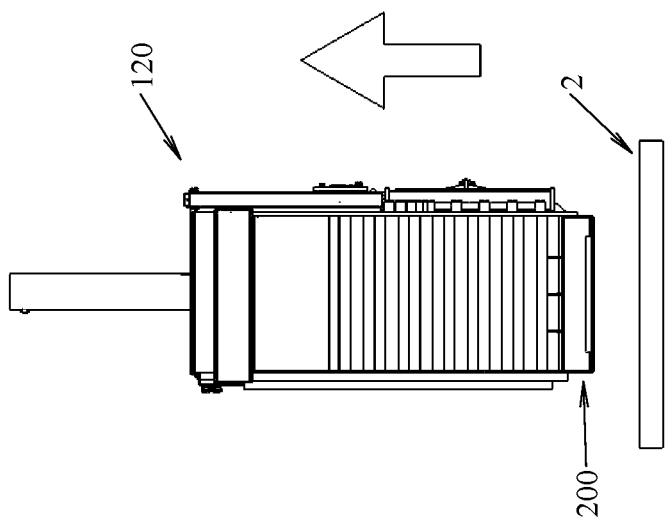
FIG. 24 shows the baler of FIG. 23 lifted in a next step of the retrofit method.

With the baler unanchored, FIG. 24 shows it then lifted up and held in place with its base frame members 200 elevated above the support surface 2, for example using a hydraulic lift jack (not shown). With the baler 120 held securely and safely above the support secure 2, the scale assemblies 121 are then mounted to the baler 120, for example to the base frame members 200, as shown in FIGS. 25-27.

And finally referring to FIGS. 28-30, after all four scale assemblies 12 have been installed, the baler 120 is then lowered back down onto resting support upon the support surface 2, with the scale assemblies 121 now supporting the entire weight of the baler 120. The mounting anchors 124 can now be moved laterally inward (toward the baler, see directional arrow in FIG. 16) over and onto the scale assemblies 121 (which are thereby received into the mounting-anchor recesses 128 and 134 through the mounting-anchor open sides) into their free-floating anchoring position. The mounting anchors 124 can then be secured in place to the support surface 2, for example by bolts or other fasteners. It will be understood that, for new installations, only the method steps of FIGS. 28-30 need be performed in the field.

It is to be understood that this invention is not limited to the specific devices, methods, conditions, or parameters described and/or shown herein, and that the terminology used herein is for the purpose of describing particular embodiments by way of example only. Thus, the terminology is intended to be broadly construed and is not intended to be limiting of the claimed invention. For example, as used in the specification including the appended claims, the singular forms "a," "an," and "one" include the plural, the term "or" means "and/or," and reference to a particular numerical value includes at least that particular value, unless the context clearly dictates otherwise. In addition, any methods described herein are not intended to be limited to the sequence of steps described but can be carried out in other sequences, unless expressly stated otherwise herein.

While the invention has been shown and described in example forms, it will be apparent to those skilled in the art that many modifications, additions, and deletions can be made therein without departing from the spirit and scope of the invention as defined by the following claims.

What is claimed is:

1. A waste-containment system, comprising:
   a waste container that contains and supports waste and is located in a use position; and
   a free-floating weighing/mounting system including one or more scale assemblies and at least one mounting anchor for each of the scale assemblies, wherein the scale assemblies are mounted to the waste container, support the entire weight of the waste container and the contained waste, and measure the weight of the waste container and the contained waste by deforming under that weight, and wherein the mounting anchors constrain the scale assemblies in the use position in a free-floating arrangement with the scale assemblies free to deform under the weight of the waste container and the contained waste without mechanical interference with the mounting anchor, wherein the scale assemblies include load cells that support the entire weight of the waste container and the contained waste, wherein the load cells are shear-beam load cells that are mounted to and extend from the weighing/mounting, and wherein the scale assemblies each further include at least one support foot that is mounted to and supports the shear-beam load cell.

2. The waste-containment system of claim 1, wherein the waste container is a compacting machine including a compacting system for compacting the contained waste, and wherein the scale assemblies weigh the compacting machine and the contained waste independently of forces applied to the waste by the compacting system.

3. The waste-containment system of claim 1, wherein the mounting anchors each include a U-shaped base including three angled base segments cooperating to define a base recess that receives a respective one of the scale assemblies to constrain the waste container from lateral movement out of the use position without mechanically interfering with the deformation of the scale assembly.

4. The waste-containment system of claim 3, wherein the mounting anchors each include a U-shaped retainer positioned atop the base and including three angled retainer segments cooperating to define a retainer recess that receives the respective scale assembly to constrain the waste container from vertical movement out of the use position without mechanically interfering with the deformation of the scale assembly.

5. A weighing/mounting system for a waste-compacting machine, the mounting system comprising:
   a plurality of scale assemblies configured to mount to the waste-compacting machine when the waste-compacting machine is in a use position, wherein the scale assemblies include load cells that support the entire weight of the waste-compacting machine and waste contained therein and that measure the combined weight of the waste-compacting machine and the contained waste by deforming under that combined weight, wherein the load cells are shear-beam load cells that are mounted to and extend from the waste-compacting machine, and wherein the scale assemblies each further include at least one support foot that is mounted to and supports the shear-beam load cell; and a plurality of mounting anchors each for use with a respective one of the scale assemblies, wherein the mounting anchors constrain the scale assemblies in the use position in a free-floating arrangement with the scale assemblies free to deform under the weight of the waste-compacting machine and the contained waste without mechanical interference with the mounting anchor.

6. The waste-containment system of claim 1, wherein the mounting anchors each include a base defining a base recess that receives a respective one of the support feet to constrain the waste container from lateral movement out of the use position without mechanically interfering with the deformation of the scale assembly.

7. A weighing/mounting system for a waste-compacting machine, the mounting system comprising:
   a plurality of scale assemblies configured to mount to the waste-compacting machine when the waste-compacting machine is in a use position, wherein the scale assemblies include load cells that support the entire weight of the waste-compacting machine and waste contained therein and that measure the combined weight of the waste-compacting machine and the contained waste by deforming under that combined weight; and
   a plurality of mounting anchors each for use with a respective one of the scale assemblies, wherein the mounting anchors each include a base with at least two segments cooperating to define a base recess that receives a respective one of the scale assemblies to constrain the waste-compacting machine from lateral movement out of the use position without mechanically interfering with the deformation of the scale assembly.

8. The weighing/mounting system of claim 7, wherein the mounting anchors each further include a retainer positioned atop the base to constrain the waste-compacting machine from vertical movement out of the use position without mechanically interfering with the deformation of the scale assembly.

9. The waste-containment system of claim 1, wherein the waste container further includes a control/communication system for communicating weight data from the scale assemblies to remote programmed computer equipment.

10. A weighing/mounting system for a waste-compacting machine, the mounting system comprising:
    a plurality of scale assemblies configured to mount to the waste-compacting machine, wherein the scale assemblies include load cells that support the entire weight of the waste-compacting machine and waste contained therein and that measure the combined weight of the waste-compacting machine and the contained waste by deforming under that combined weight; and
    a plurality of mounting anchors each for use with a respective one of the scale assemblies, wherein the mounting anchors each include a base and a retainer, wherein the base includes at least two segments cooperating to define a base recess that receives the respective scale assembly to constrain the waste-compacting machine from lateral movement out of the use position without mechanically interfering with the deformation of the scale assembly, and wherein the retainer is positioned atop the base to constrain the waste-compacting machine from vertical movement out of the use position without mechanically interfering with the deformation of the respective scale assembly.

11. The weighing/mounting system of claim 10, wherein the mounting-anchor bases are each U-shaped with three angled base segments cooperating to define the base recess.

12. The weighing/mounting system of claim 11, wherein the mounting-anchor retainers are each U-shaped with three angled retainer segments cooperating to define a retainer recess that receives the respective scale assembly without mechanically interfering with the deformation of the scale assembly.

13. The weighing/mounting system of claim 10, wherein the load cells are shear-beam load cells that are mounted to and extend from the waste-compacting machine, and wherein the scale assemblies each further include at least one support foot that is mounted to and supports the shear-beam load cell.

14. The weighing/mounting system of claim 13, wherein the mounting-anchor base recesses each receive the respective support foot to constrain the waste-compacting machine from lateral movement out of the use position without mechanically interfering with the deformation of the scale assembly.

15. The weighing/mounting system of claim 10, wherein the base recesses of the mounting-anchor bases are each oversized relative to the respective scale assembly to provide a loose fit of the scale assembly in the base recess with a lateral spacing between the scale assembly and the base.

16. The weighing/mounting system of claim 15, wherein the mounting-anchor retainers are positioned sufficiently above the mounting-anchor bases to provide a loose fit of the scale assembly in the base recess with a vertical spacing between the scale assembly and the base.

17. A method of retrofitting a waste-compacting machine for weight measurement, the method comprising:
    if the waste-compacting machine is anchored to a support surface, unanchoring the waste-compacting machine;
    lifting the waste-compacting machine up above the support surface;
    mounting a plurality of scale assemblies including load cells to the waste-compacting machine;
    lowering the waste-compacting machine down onto the support surface so that the load cells support the entire weight of the waste-compacting machine and waste contained therein and measure the combined weight of the waste-compacting machine and the contained waste by deforming under that combined weight; and
    anchoring the waste-compacting machine to the support surface in a use position and in a free-floating arrangement by using mounting anchors that constrain the scale assemblies in the use position with the scale assemblies free to deform under the weight of the waste-compacting machine and the contained waste without mechanical interference with the mounting anchors, wherein the mounting anchors each include a base having at least two segments cooperating to define a base recess with at least one open side, and wherein the anchoring step includes positioning the two base segments of at least one mounting anchor at opposite sides of one of the scale assemblies in an installed position so that the respective scale assembly is received in the respective base recess to constrain the waste-compacting machine from lateral movement out of the use position without mechanically interfering with the deformation of the scale assembly.

18. The retrofit method of claim 17, wherein the mounting anchors each further include at least one retainer positioned atop the base to constrain the waste-compacting machine from vertical movement out of the use position without mechanically interfering with the deformation of the respective scale assembly.

19. The retrofit method of claim 17, wherein the anchoring step further includes moving the two base segments into the installed position with the respective scale assembly passing through the open side of the base.

20. The weighing/mounting system of claim 7, wherein the mounting-anchor bases each include three of the base segments in a U-shaped arrangement that defines the base recess.

21. The weighing/mounting system of claim 5, wherein the mounting anchors each include a base defining a base recess that receives a respective one of the support feet to constrain the waste-compacting machine from lateral movement out of the use position without mechanically interfering with the deformation of the scale assembly.

22. The weighing/mounting system of claim 5, wherein the shear-beam load cells have a first end and a second opposite end, with the first end configured to be mounted to the waste-compacting machine, and with the respective support foot mounted to the second opposite end.

23. A method of retrofitting a waste-compacting machine for weight measurement, the method comprising:
if the waste-compacting machine is anchored to a support surface, unanchoring the waste-compacting machine;
lifting the waste-compacting machine up above the support surface;
mounting a plurality of scale assemblies including shear-beam load cells and support feet to the waste-compacting machine with each of the shear-beam load cells mounted to and extending from the waste-compacting machine and with each of the support feet mounted to and supporting the respective shear-beam load cell;
lowering the waste-compacting machine down onto the support surface so that the shear-beam load cells support the entire weight of the waste-compacting machine and waste contained therein and measure the combined weight of the waste-compacting machine and the contained waste by deforming under that combined weight; and
anchoring the waste-compacting machine to the support surface in a use position and in a free-floating arrangement by using mounting anchors that constrain the scale assemblies in the use position with the scale assemblies free to deform under the weight of the waste-compacting machine and the contained waste without mechanical interference with the mounting anchors, wherein the mounting anchors each include a base defining a base recess that receives a respective one of the scale assemblies, and wherein the anchoring step includes positioning each of the mounting anchors at in an installed position with the respective scale assembly received in the respective base recess to constrain the waste-compacting machine from lateral movement out of the use position without mechanically interfering with the deformation of the scale assembly.

24. The retrofit method of claim 21, wherein the anchoring step further includes positioning each of the mounting anchors at in the installed position with the support foot of the respective scale assembly received in the respective base recess.

* * * * *